2 Sheets--Sheet 1.

E. SMITH.
Stoves.

No. 6,091. Reissued Oct. 20, 1874.

Witnesses. { David J. Griffing
Chas. J. Selkirk.

Elihu Smith
Per Chas. Selkirk
Attorney

Inventor.

THE GRAPHIC CO. PHOTO-LITH. 39 & 41 PARK PLACE, N.Y.

E. SMITH.
Stoves.

No. 6,091. Reissued Oct. 20, 1874.

Witnesses. { David J. Griffing, Chas. J. Sickels.

Elisha Smith, Per Alex. Selkirk, Attorney. Inventor.

THE GRAPHIC CO. PHOTO-LITH. 39 & 41 PARK PLACE, N.Y.

UNITED STATES PATENT OFFICE.

ELIHU SMITH, OF ALBANY, NEW YORK.

IMPROVEMENT IN STOVES.

Specification forming part of Letters Patent No. 88,986, dated April 13, 1869; reissue No. 5,709, dated December 30, 1873; reissue No. 5,962, dated July 7, 1874; reissue No. 6,091, dated October 20, 1874; application filed August 10, 1874.

*To all whom it may concern:*

Be it known that I, ELIHU SMITH, of the city and county of Albany, State of New York, have invented certain new and useful Improvements in Self-Feeding or Base-Burning Fuel-Reservoir Stoves; and I do hereby declare that the following is a description thereof, reference being had to the accompanying drawings, forming a part of this specification, in two sheets, in which—

Figure 1:
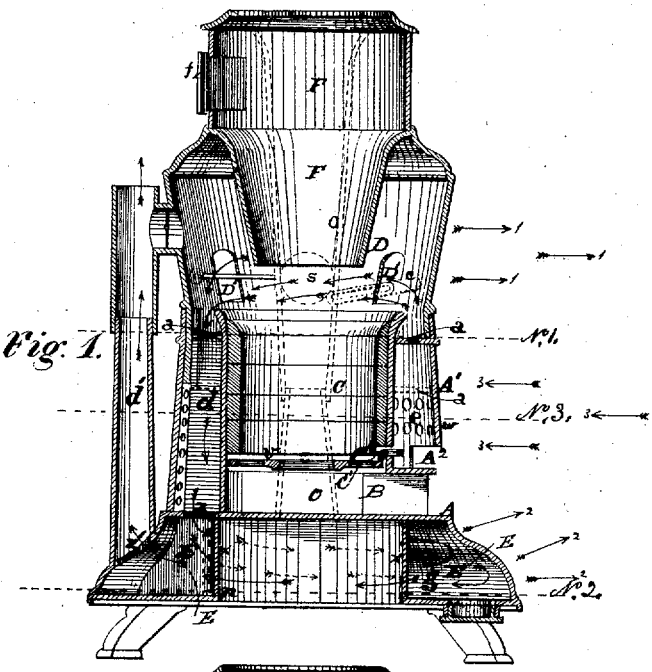
Figure 2:
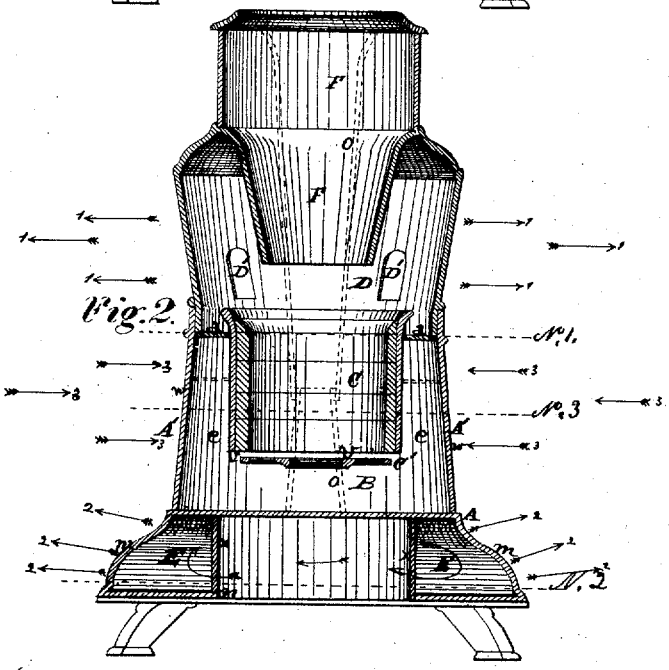
Figure 3:
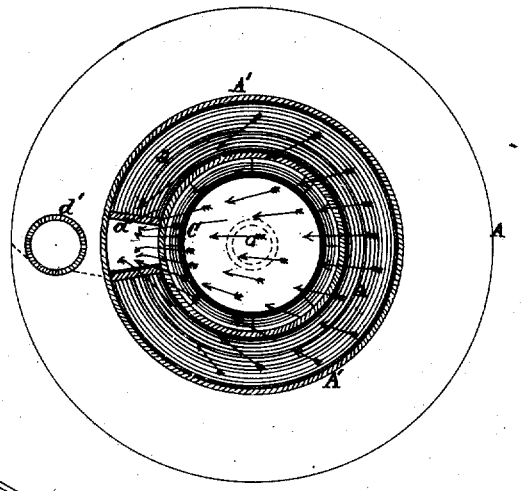
Figure 4:
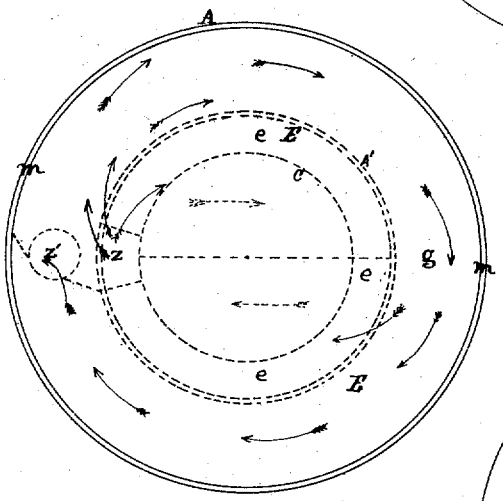
Figure 5:
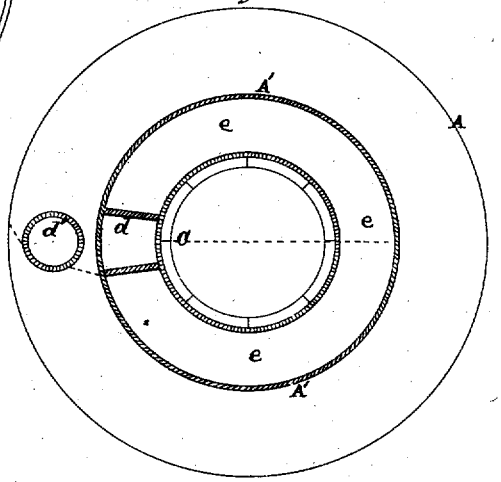

Figure 1 represents a sectional elevation of the stove, taken from front to rear, illustrating the improvements in this invention. Fig. 2 is a sectional elevation taken in the transverse. Fig. 3 is a horizontal view taken at line No. 1 in Figs. 1 and 2. Fig. 4 is a horizontal view taken at line No. 2 in Figs. 1 and 2. Fig. 5 is a horizontal view taken at line line No. 3 in Figs. 1 and 2.

My invention relates to that class of stoves or heaters employing a fuel-reservoir, suspended over the fire-pot, and supplying fuel to the same by gravity, and employing an upward draft from the grate through the base of the column of fuel into a free space or combustion-chamber above the fire-pot; and consists in a section of the stove, incasing the fire-pot, with an air-space between the said fire-pot and the casing-walls of the said section, to prevent the said walls from being highly heated, in combination with a combustion-chamber section above the fire-pot, and capable of being highly heated by the gases in combustion therein, and a base-chamber containing a gas-circulating chamber below, capable of being highly heated by the hot gases drawn from the combustion-chamber above, through a descending flue at the rear of the stove, all arranged in such a manner that the said section is capable of being heated only to a low temperature, and will intervene between the combustion-chamber section and the base-chamber section, capable of being heated by the hot gases to a high temperature. The object of this part of my invention is to induce, by the said parts, a circulation of the air in the room to be warmed, by unevenly warming the strata of air surrounding the stove, so that a middle stratum, but slightly warmed, may be drawn toward the stove to replace the air thrown back by the radiant heat from the more highly-heated sections above and below, and thereby prevent a stagnation of the atmosphere of the room, and preserve it more healthy to the occupants, and by the said circulation to enable the stove to more readily and uniformly warm the room.

Another part consists in the combination of a descending flue, placed at the rear of the stove, and exposed to the radiant heat from the fire-pot, with a combustion-chamber constituted by the space above the fire-pot and around the lower portion of the fuel-reservoir, and set with mica lights in its walls. The object of this part of my invention is to draw the gaseous products of combustion, continually evolved from the top surface of the fuel in the fire-pot, as it is constantly supplied from the reservoir, from the several sides and mica lights of the combustion-chamber, over the fire to the rear of the stove, and thereby prevent the gases from dimming or blackening the mica lights, that they may be preserved in a condition capable of a maximum transmission of light for illumination and heat for warming purposes.

Another part of my invention consists in the combination, with a combustion-chamber over the fire and around the lower portion of the fuel-reservoir, a descending flue at the rear of the stove, heated by the radiant heat of the fire-pot, and an ascending flue near to or adjoining the said descending flue, of a hot-gas-circulating chamber below the ash-pan chamber and the bottom plate proper of the stove, in which the hot gases from the combustion-chamber may be drawn through the said descending flue, to pass in a single current from rear to front on one side, and thence backward to the rear on the opposite side, to escape through the said ascending exit-flue. The object of this part of my invention is to produce a high heating of the base of the stove, by causing the hot gases, drawn from the combustion-chamber into the chamber made in the said base, to pass in a single and continuous current from rear to front on one side, and thence backward on the opposite side, to their exit, that by their passage may impinge, in part, all around the entire inner circumference of the said chamber, to highly heat the base-section, and render it more effective for warming the air near the floor.

To enable others skilled in the art to make and use my invention, I will proceed to describe it in reference to the drawings, and the letters of reference marked thereon, the same letters indicating like or similar parts.

In the drawings, A represents the base of the stove. $A^1$ is the fire-pot section of the casing above the base, and incloses the ash-pan chamber B, and the fire-pot. C is the fire-pot, made in the usual manner, with solid pots, and with or without a lining of fire-brick or other equivalent material. C′ is the grate. D is the combustion-chamber in which the gases are evolved from the upper surface of the burning coals in the fire-pot. D′ D′ are mica windows set with the walls of the said combustion-chamber for transmission of light and heat to the room from the interior of the said chamber. F is a fuel-reservoir suspended over the fire-pot for supplying fuel thereto in a continuous manner. The above-mentioned parts may be constructed in any known manner, and with any of the known forms practiced by the trade. Made in the casing $A^1$, opposite the space *v* in the front or sides of the said casing, is the opening, $A^2$, or door through which the poker or other instrument may be inserted for operation in the said space, for the removal of the refuse matter on the grate. In this stove it is intended to warm the room mainly by means of the heat radiated from the base A, or bottom portion of the stove, and from the combustion-chamber D, and the heat transmitted through the mica lights D′ made with the walls of the said combustion-chamber. The portion of the stove between the said base and combustion-chamber—that is, the fire-pot section—is intended to be preserved at a low temperature, so as to be capable of contributing but little to the warming of the room. To accomplish this, the fire-pot C is suspended or supported within the casing $A^1$, with a free space, *e*, between the same and the fire-pot, communicating with the ash-pan chamber below, but not with the combustion-chamber above. To cut off all communication of the said free space *e* with the combustion-chamber, a plate or plates, *a*, arranged at or near the upper portion of the fire-pot, and between it and the casing of the section $A^1$, is employed. A flue, *d*, placed at the rear of the fire-pot, and leading into the base-section A, conducts the products of combustion from the combustion-chamber into the said base-section in a single current, at the rear of the stove, so that the walls *w* of the casing of the section $A^1$, at its sides and front, may be preserved at a comparatively low temperature by reason of the free space *e*, between them and the fire-pot, in which fresh air may enter, and operate as a non-conductor. By thus heating the air of the room from the highly heated combustion-chamber above, and the highly-heated base-section below, with the section $A^1$ of lower temperature intervening between, a complete and thorough circulation of the air in the room may be effected, as the radiant heat from the combustion-chamber and the base-section will act on the air in contact with the wall of the said parts to induce currents outward from the same, as indicated by arrows 1 and 2 in Fig. 2, while between the said currents will be induced a current of cooler air toward the stove, to replace the air thrown outward from above and below by the radiant heat from the combustion-chamber and the base-section, as indicated by arrows 3, in Fig. 2.

By this operation of the said parts the air of the room may be made to circulate more perfectly, so as to give a more healthy condition to the atmosphere, by reason of prevention of the stagnation of the air, and the room may be more quickly and uniformly warmed than can be by stoves, having all its parts of about the same temperature, as in the case with stoves having the fire-pot section, combustion-chamber section, and base heated, and employing sheet or side flues for a revertible draft, to cause the sections below the combustion-chamber to become highly heated for warming purposes.

The descending flue *d*, through which the hot gaseous products of combustion are drawn from the combustion-chamber D, is located, at the rear of the fire-pot, in such a manner that the said flue may be highly heated by the radiant heat from the said fire-pot. Being thus placed and highly heated, the draft will be greatly stimulated, and rendered sharper than if the said flue were unaffected by the heat radiated from the fire-pot.

The gaseous products evolved from the surface of the burning coals constantly and freshly supplied from the reservoir are drawn from the sides of the wall of the combustion-chamber, and from the mica lights set therewith, over the fire toward, and to the rear of, the stove in a single volume, to enter the descending flue, as indicated by arrows in Fig. 3.

By thus placing the descending flue, and causing the gaseous products to escape in a single current or volume from the combustion-chamber to the rear descending flue, the mica lights placed with the walls of the combustion-chamber may be prevented from being dimmed or blackened by the said gaseous products, as is the case in stoves employing side or sheet flues, dividing the volumes of gases, and drawing the same into several currents by the draft toward the said mica.

The great advantage obtained by thus preventing the dimming and blackening of the micas is the preserving the conditions of the micas necessary for obtaining great illumination from the fire, and the transmission of the maximum quantity of heat that mica is capable of, which is twenty per cent. more than can be had by radiation from cast-iron heated by the same fire.

The hot-gases drawn from the combustion-chamber D in a single current, through the descending flue *d*, are discharged into the chamber E, made in the base A, (shown in Figs. 1, 2, and 4,) through the opening *z*. The said chamber I denominate the hot-gas-circulating chamber, through which the hot gases pass from the opening *z*, at the rear, to the front on one side of a dividing plate or plates, *x*, and thence, entering to the opposite side through the passage *g*, pass backward to the rear, performing a complete, or approximately complete, circuit underneath the bottom plate of the ash-pan chamber, and heating the entire circumference of the outer sides *m* of the said chamber. Having completed the entire circuit of the said chamber, the gases will escape through the opening $z^1$, and enter the ascending flue $d^1$, as they are drawn to the chimney after they have given off, by radiation and conduction, nearly the entire quantity of heat which they carried from the combustion-chamber.

The gas-circulating chamber is comprised by the plate *n* forming its bottom, the plate A forming the top, and also the bottom, of the ash-pan chamber, and the inclined annular base-plate *m* forming the sides. The said inclined annular side plate is made with a greater diameter in its lower portion than in its upper part, as shown in Figs. 1 and 2, so that the hot gases circulating within, and tending naturally to rise to the top of the said chamber, will be forced, by the contraction of the said upper portion, to crowd down, and more thoroughly heat, the lower parts of the said sides.

The said base-plate may be made with any desired form of conformation of surface desired which will permit the preserving of the inclined form described.

Base-plates inclosing side flues discharged into by sheet or side flues leading from the combustion-chamber having inclined sides, have been used, but such inclined sides were only partially heated, as the flues contained within occupied only a portion of the sides of the base, and did not encircle the whole circumference of the same, and the several currents passing into the base at different points toward a central flue, and from the said inclined sides; while in my invention the said inclined plate is impinged on, in its entire circumference, by the hot gases circulating within the chamber, in its passage from rear to front on one side, and thence backward to the rear on the opposite side.

By the inclined form the radiating-surfaces of the said plate will throw off the heat, at right angles with its surfaces, at the different points, substantially as indicated by arrows 2, in Figs. 2 and 3.

The ascending flue *d'* is located in close proximity with the descending flue *d*, and may be made to have walls independent of those of the said descending flue, as shown; or have one of its walls formed by an adjoining wall of the same. In either case the results will be the same, as the openings *z* and *z'* from the said flues to the gas-circulating chamber would be at the rear of the said chamber, and so near each other as to induce an approximately entire circuit of the hot gases in the said chamber before their escape therefrom.

With the improvements above described in this invention is employed an air-chamber, located centrally within the hot-gas-circulating chamber E, as shown by dotted lines, the sides of which would be heated by the hot gases circulating around such chamber. From the said central chamber is the flue O, shown by dotted lines, extending upward through the ash-pan chamber, fire-pot, combustion-chamber, and reservoir, and open at the top of the stove. This vertical hot-air flue communicates with the space in the room to be warmed through lateral branch flues *c*, Fig. 1, which pass from the main upright flue through the combustion-chamber and the outer wall of the same, for the purpose of discharging the heated air of the said main flue lower down or nearer the floor than the top of the stove when the valve *s* is closed; but when the said valve is open the heated air will, in most part, be discharged from the top of the stove. An opening, *h*, closed by a cap, is provided, for the purpose of cleaning the hot-gas-circulating chamber.

Having described my invention, what I claim, and desire to secure by Letters Patent, is—

1. In a stove or heater having a coal-reservoir supported over a fire-pot, and supplying fuel by gravity, and a combustion-chamber above the said fire-pot and around the lower end of the fuel-reservoir, the combination, with a descending flue placed at the rear of the stove, and heated by the radiant heat of the fire-pot, and an ascending flue for the exit of the gaseous products of the chimney placed near to or adjoining the said descending flue, of a hot-gas-circulating chamber, located below the ash-pan chamber and the bottom plate proper of the stove, in which the hot gases drawn from the combustion-chamber may pass in a single and continuous current from rear to front at one side, and in a backward course from front to rear on the opposite side, impinging, in part, all around the entire inner circumference of the circular outer plate or sides of the said hot-gas-circulating chamber, substantially as set forth.

2. In a stove or heater, the combination of a combustion-chamber above the fire-pot, in which the hot gases are evolved, a gas-circulating chamber in the base of the stove beneath the ash-pan chamber and the bottom plate proper of the stove, through which the hot gases may pass in a single and continuous current from the rear to the front, and thence backward from front to rear, a descending flue heated by the radiant heat of the fire-pot, and communicating from the combustion-chamber above to the said hot-gas chamber in said base below the ash-pan chamber, an ascending flue located near the said descending flue and communicating from the gas-circulating chamber in the base to the exit, and a fire-pot section with an air-space between the fire-pot and its casing, communicating with the ash-pan chamber above the circulating-flue intervening between the said combustion-chamber and the said hot-gas chamber, to cut off all communication between the said combustion-chamber and hot-gas-circulating chamber, excepting by the said descending flue at the rear, substantially as set forth.

3. In a stove or heater, the combination, with a combustion-chamber inclosed by a wall set with mica lights, and a fuel-reservoir supplying fuel to the fire-pot in a continuous manner from its discharge end, terminating within the said combustion-chamber and opposite said mica lights, of the descending flue located within the casing of the stove, in rear of and adjoining the fire-pot, heated by radiant heat from the latter, and communicating from the said combustion-chamber to the hot-gas chamber located below the ash-pan chamber, and in the base of the stove, through which the gaseous products of combustion evolved from the fuel continuously supplied to the fire may be drawn from the front and sides of the combustion-chamber, and from the mica lights set in the walls thereof, over the fire and into the said descending flue in rear of and adjoining the fire-pot, substantially as set forth.

ELIHU SMITH.

Witnesses:

DAVID J. GRIFFING,
CHAS. J. SELKIRK.